Sept 10, 1957 L. LEITZ ET AL 2,805,608
PHOTOGRAPHIC CAMERA WITH EXCHANGEABLE
OBJECTIVES AND ADJUSTABLE VIEW FINDER
Filed Oct. 1, 1953 5 Sheets-Sheet 4
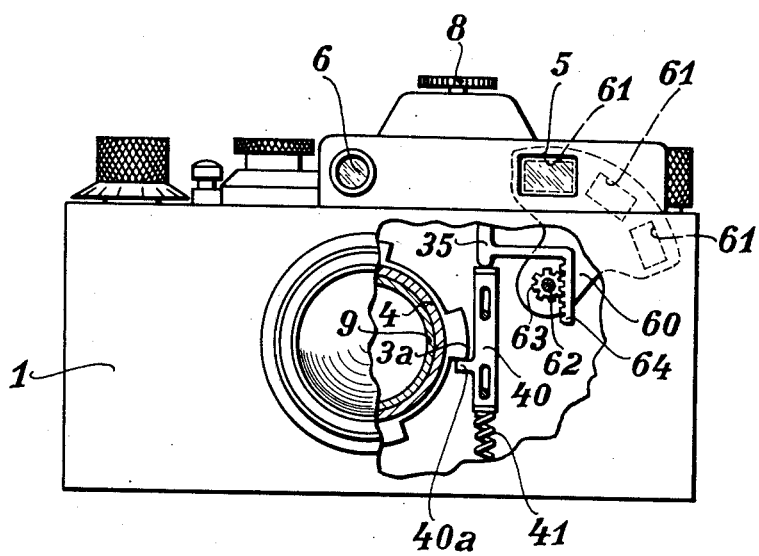

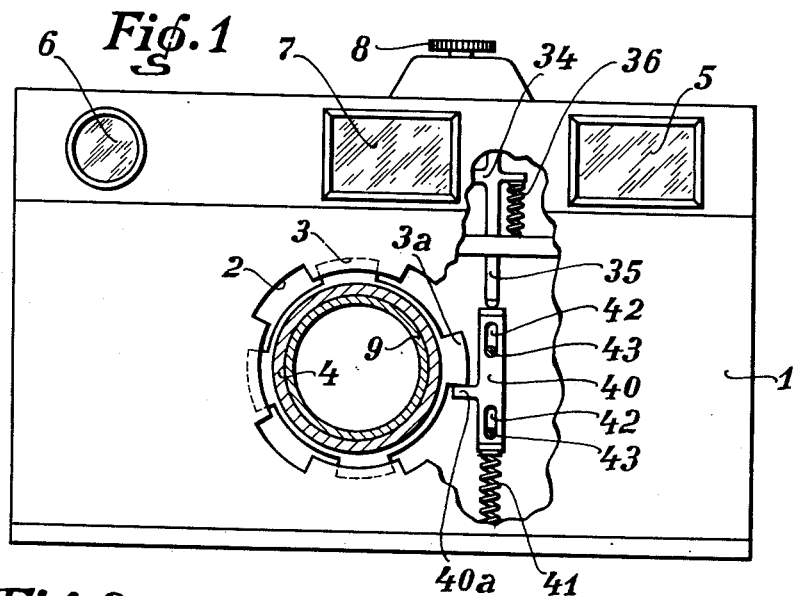
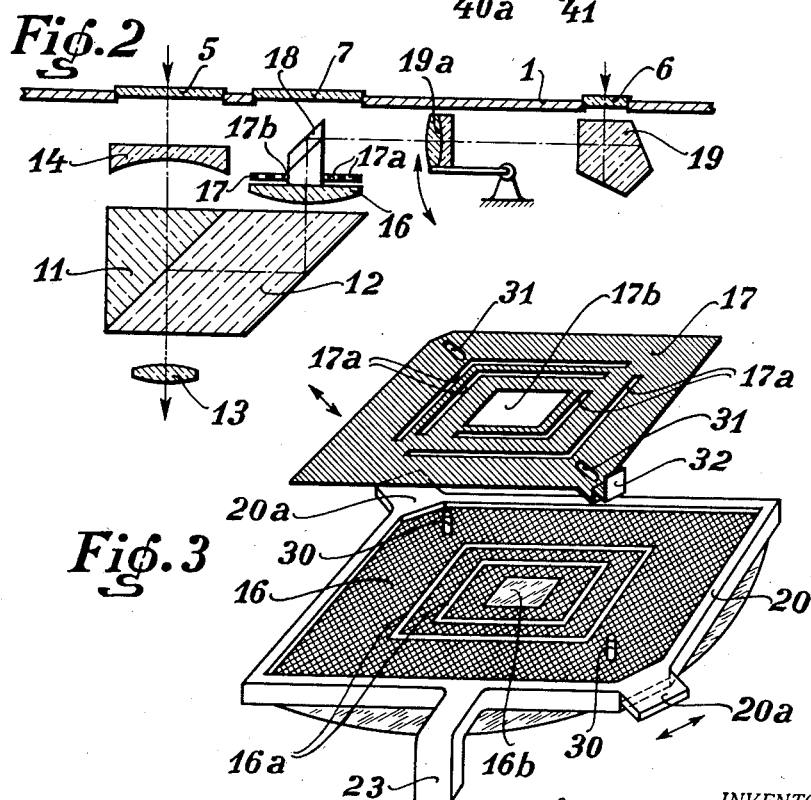

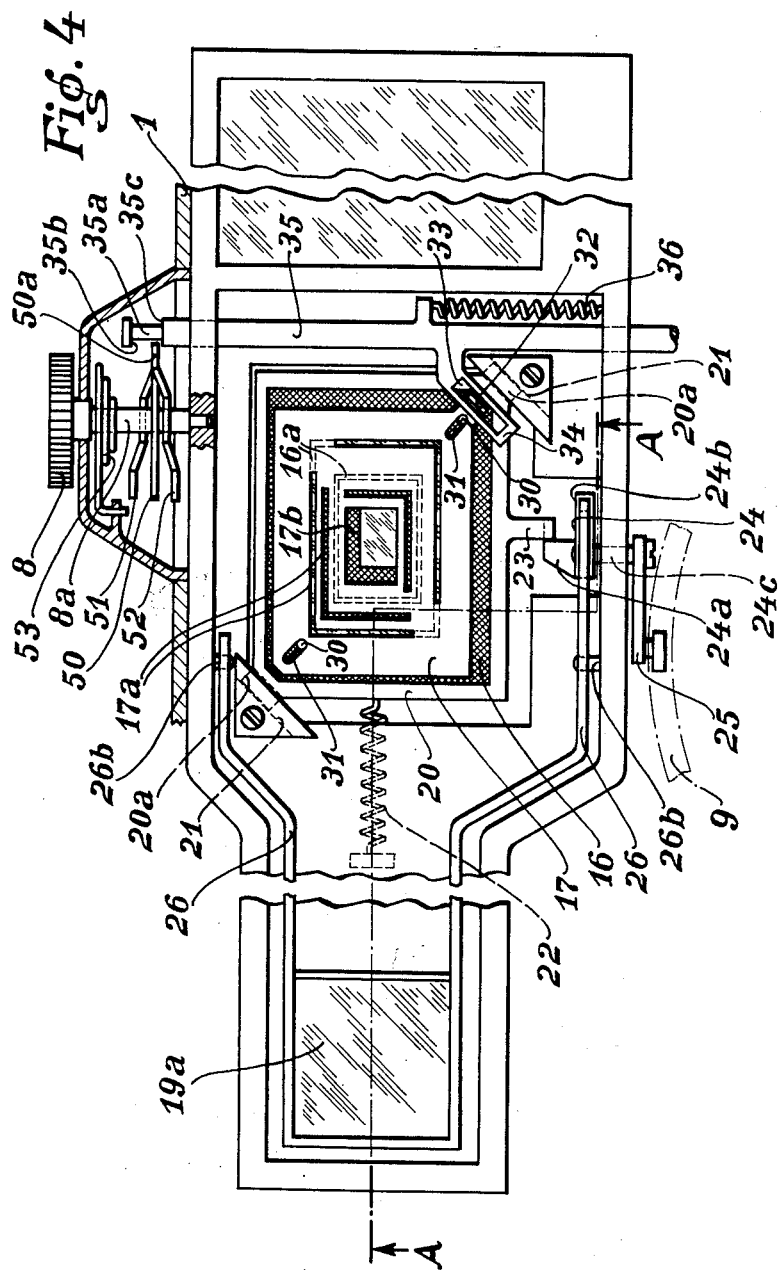

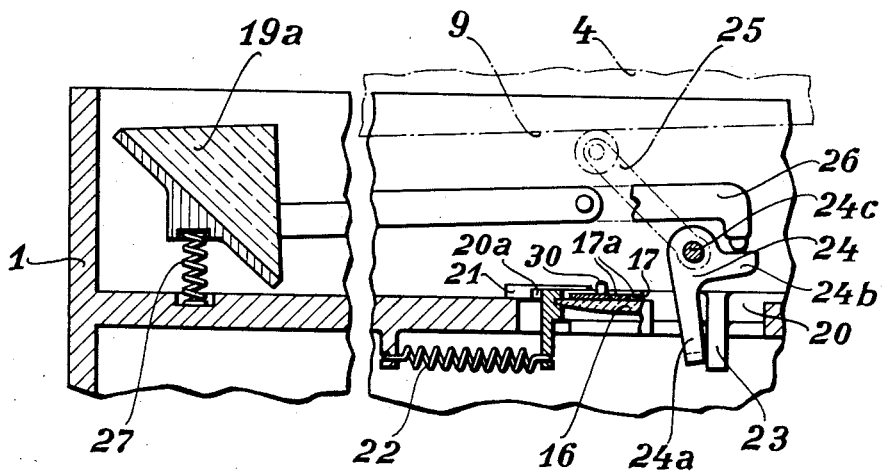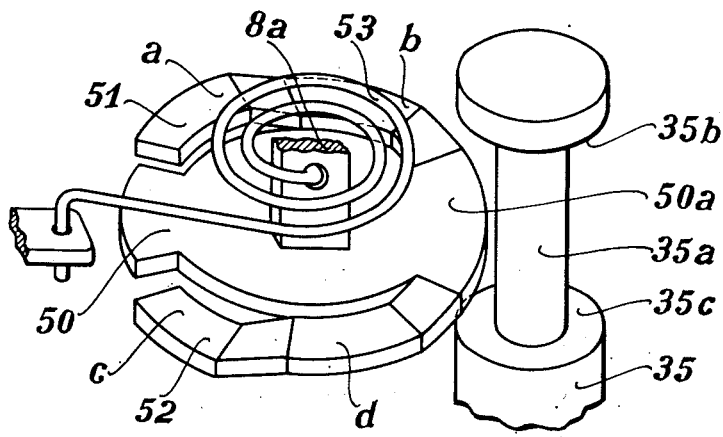

Sept 10, 1957
L. LEITZ ET AL
2,805,608
PHOTOGRAPHIC CAMERA WITH EXCHANGEABLE
OBJECTIVES AND ADJUSTABLE VIEW FINDER
Filed Oct. 1, 1953
5 Sheets-Sheet 5
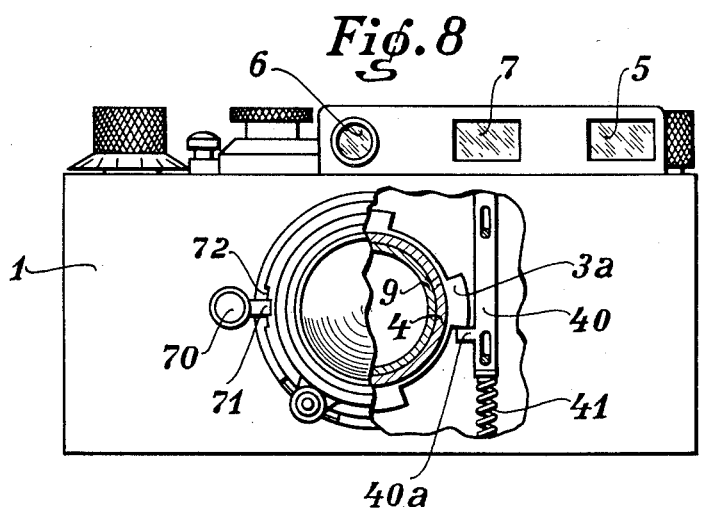
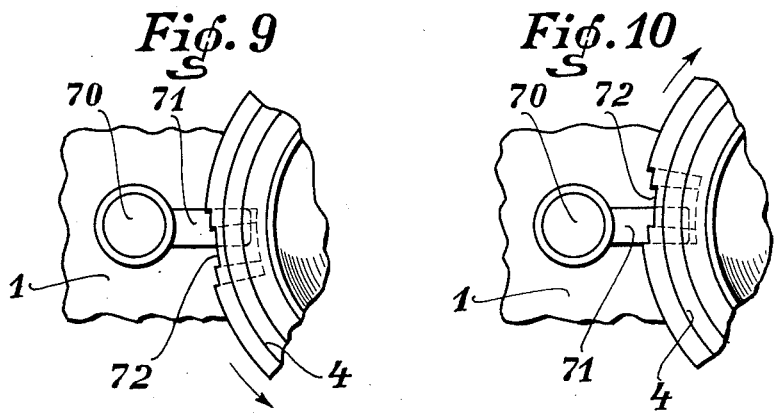
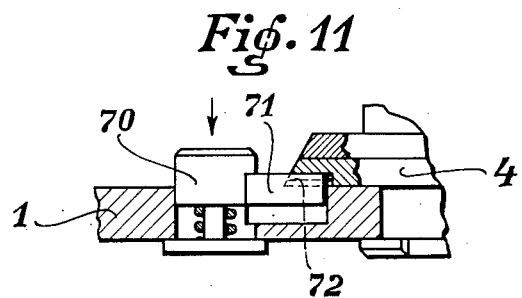

United States Patent Office 2,805,608
Patented Sept. 10, 1957

2,805,608

PHOTOGRAPHIC CAMERA WITH EXCHANGEABLE OBJECTIVES AND ADJUSTABLE VIEW FINDER

Ludwig Leitz and Hugo Wehrenfennig, Wetzlar, Germany, assignors to Ernst Leitz, G. m. b. H., a corporation of Germany Application October 1, 1953, Serial No. 383,649

Claims priority, application Germany October 9, 1952

9 Claims. (Cl. 95—44)

This invention relates to photographic cameras with exchangeable objectives and which include a view finder system in which the size of the finder picture is automatically limited or framed so as to correspond in size to the focal length of the particular objective which is at the moment attached to the camera.

One object of the invention is to provide novel improved means whereby, when a particular objective is attached to the camera, the view finder system is automatically operated so as to present a finder picture of a dimension or framed size which is correct for the focal length of the attached objective.

Another object is to provide the camera with a manually actuated mechanism whereby the size of the finder picture may be selectively determined without regard to the focal length of the objective which is attached to the camera.

The invention therefore provides means whereby not only may the correct size of the finder picture be automatically determined to correspond in size to the focal length of the attached objective and observed by the user, but it is also possible to select other sizes for the view picture by manual operation of the finder system irrespective of the focal length of the attached objective. For example, one may use the manual means for establishing a size of the picture seen in the finder which is most suitable for the local scene and thereby determine the correct objective to be used. The manual means may also be used as a try out mechanism whereby to determine the size and other aspects of the scene to be photographed. With the foregoing and other objects in view, the invention is embodied in a camera and view finder mechanism which is arranged and constructed as hereinafter set forth and as illustrated in the accompanying drawings in which—

Fig. 1 is a front view of a camera and view finder system embodying the invention with parts broken away to show the connecting means between the objective and the view finder.

Fig. 2 is a diagrammatic view of the view finder system in which the view framing members are observed by means of optical reflecting elements.

Fig. 3 is an enlarged perspective view of the view framing members.

Fig. 4 is an enlarged view of the mechanical elements of the view finder whereby the picture is framed and the picture parallax compensated for.

Fig. 5 is a horizontal sectional view of parts of the finder mechanism taken substantially on the line A—A of Fig. 4.

Fig. 6 is a detail view in perspective showing parts of the hand operated mechanism for framing the view picture.

Fig. 7 illustrates a modification with modified view picture framing means.

Figs. 8–11 are detail views illustrating modified means for attaching the objective to the camera and modified manual means for selective framing of the view picture.

Referring first to Figs. 1–3, the camera 1 is provided with a bayonet joint for attaching exchangeable objectives to the camera. The bayonet joint includes the flanges 2 which are fixed on the camera and other flanges 3 which are integral with the tubular bearing 4 for the rotatable and axially movable focusing tube 9 of the objective. Such connecting and focusing means are known in the art. The view finder is arranged above the objective and includes the view opening 5, the measuring ray window 6 and the illuminating ray window 7 through which the picture framing borders are illuminated. On top of the camera casing there is a hand knob 8 for operating the mechanism for manually adjusting the borders which enclose the view picture without regard to the focal length of the selected attached objective.

The optical finder system comprises the rays dividing prisma 11, 12 with an inverted Galilean telescope 13, 14 in the path of the direct rays. In the path of the indirect rays there is arranged a framing member 16 with the picture borders 16a which are imaged via the prism 12. In front of the framing member 16 there is a slidable plate 17. The indirectly transmitted comparison picture or finder view is imaged in the plane of the picture framing borders 16a by means of the indirect rays which enter through the window 6 and then pass through the prism 19, the telescope objective 19a and the prism 18 to the prism 12 and are seen in the ocular 13.

The framing member 16, Fig. 3, has placed thereon sets of concentric borders 16a and a centrally disposed frame 16b which sharply defines the measuring field. The plate 17, which is adapted to slide across the member 16, has a central opening 17b for the passage of the measuring light rays and it also is provided with sets of right angled slots 17a offset with respect to the opening 17b. The slots 17a are so arranged and spaced that when the plate 17 is moved in a diagonal direction across the member 16 controlled by guide means 30, 31, one or the other set of borders 16a register with corresponding slots 17a and are therefore free to receive the light rays from the window 7 and the image of the borders is reflected by the prism 12 into the ocular 13. The member 16 with the picture framing borders 16a is carried within a frame 20, Figs. 3, 4. The frame 20 has in the opposite corners guiding lugs 20a which are adapted to slide in guides 21 supported in the camera housing. A spring 22, Fig. 5, constantly urges the frames 20 into ∞-position of the range finder. The frame 20 has a finger 23 which is engaged by the one arm 24a of a bell crank 24 which is secured upon the inner end of a short shaft 24c. The outer end of the shaft carries an arm 25 which engages the curve formed inner end of the focusing tube 9 and whereby the axial adjustment of the objective causes a corresponding swinging movement of the bell crank 24 as will be understood, Fig. 5. The other arm 24b of the bell crank engages the swinging double lever 26 which carries the optical swinging member of the range finder system which may be either the telescope objective 19a, as in Fig. 2, or the prism 19. A spring 27, Fig. 5, engages the swinging lever 26 to keep it in contact with the bell crank arm 24b. Fig. 4 shows the double armed swinging lever 26 pivoted at 26b on opposite sides of the camera housing. The elements described in this paragraph are so proportioned that the diagonal movement of the frame member 16 with the borders 16a along the guides 21, which movement occurs when the objective is focused, causes compensation for the parallax of the finder picture in relation to the focusing distance of the objective.

The plate 17 is supported upon the member 16 and movably guided thereupon by means of pins 30 on the member which engage slots 31 in the plate. The movement direction of the plate 17 opposite the member 16 controlled by guide means 30, 31 is right angled to the movement direction of the frame 20 controlled by guide means 20a, 21. The plate 17 is also provided with an upstanding nose 32 which engages an inclined slot 33 in an arm 34 which extends to one side of and is a part of a rod 35, Fig. 4. The rod 35 is supported in a vertically slidable position. The upper end of the rod 35 has a reduced portion 35a which forms an upper shoulder 35b and a lower shoulder 35c on the rod. The upper shouldered end of the rod 35 is adapted to be engaged by either one of the two arms 51 and 52 of a cam 50, Figs. 4, 6. The cam 50 is fast on the shaft 8a of the hand knob 8. By rotating the knob 8 in one direction the cam arm 51 is brought into engagement with the upper shoulder 35b to lift the rod 35, or by rotating the knob in the opposite direction the other cam arm 50 is brought into engagement with the lower shoulder 35c to depress the rod as will be understood. The cam 50 has an intermediate cam step 50a and a spiral spring 53 tends to keep the cam step 50a opposite the reduced portion 35a of the rod 35. This is a zero position of the manually operated cam 50. Preferably this zero position corresponds to the positions of the picture framing members when a standard objective with a normal length of focus is attached to the camera. The cam arms 51 and 52 have steps a, b, c and d, which merge one into the other and correspond to different focal lengths of different objectives.

Instead of using the cam 50 as an equalizing balance member for limiting the movements of the picture framing members when the objective is detached, the manually operated means may be blocked when the objective is detached in that the rod 35 may be caused to enter a notch on the cam 50 under spring pressure. The modification is not illustrated.

The lower end of the rod 35 rests upon a slide 40 which is supported in the camera on pins 43 which engage slots 42 in the slide as shown in Fig. 1. A spring 41 presses the slide upwards against the rod. The slide has a nose 40a which lies within the range of movement of the bayonet flange 3a on the camera objective. The flange 3a is of a circular length which corresponds to or is proportioned to the focal length of the objective. Hence, when the bayonet joint connection is made between the objective and the camera, the slide 40 is moved a variable corresponding distance against the force of the spring 41.

The operation of entire above described mechanism is as follows: An objective with a given focal length is provided with a bayonet joint flange 3a of a corresponding given length. When this objective is mounted upon the camera by such bayonet joint connection, Fig. 1, the flange 3a moves the slide 40 a corresponding distance by engaging the slide nose 40a. The rod 35 is then moved down a like distance by the spring 36 and the inclined slotted arm 34 on rod 35 in turn moves the slotted plate 17 diagonally across the framing member 16 a given distance whereby certain of the slots 17a are brought in to registry or alinement with certain of the borders 16a which are thereby uncovered and free to receive the light rays to be imaged as borders for the view picture which corresponds in size to the focal length of the objective which is attached to the camera.

As the rod 35 is moved down, the upper end thereof is also brought into a certain position relative to the cam 50, so that, for example, the intermediate cam step 50a is midways between the shoulders 35b and 35c on the rod. If it is now desired to ascertain whether the picture seen in the finder requires a better use of the format of the film or that better view may be obtained by using an objective with a different focal length than that of the attached objective, then, in order to change the finder frame mechanism, the knob 8 may be rotated in either direction.

When the knob 8 is rotated in one direction the cam arm 51 is moved in under the upper shoulder 35b on the rod 35 and the latter is then lifted a corresponding distance against the force of the spring 36. The lifting movement of the rod causes another diagonal movement of the plate 17 so that the slots 17a are brought into alinement with another set of picture borders 16a on the member 16 and such other alinement then causes the picture to be framed in a size corresponding to a different focal length of an objective than the focal length of the objective which is then attached to the camera. When the knob 8 is released, the springs 53 and 36 move the parts back into the first adjusted positions.

If the knob 8 is rotated in the opposite direction, the cam arm 52 engages the lower shoulder 35c of the rod 35 and latter is moved down. The downward movement overcomes the power of the lifting spring 41 and causes a diagonal movement of the plate 17 but in the opposite direction whereby another set of slots 17a becomes alined with another set of picture borders 16a for the passage of the light rays. The alinement, the second time, of the slots 17a with the borders 16a then corresponds to and indicates whether a different objective with a different focal length should be used in place of the objective which is attached to the camera. When the knob 8 is again released the parts go back into the first adjusted position and the framing of the view picture corresponding to the focal length of the attached objective is again restored, see Figs. 1, 4 and 6.

If the focusing of the objective requires an axial adjustment of the focusing tube 9, the inner end of the focusing tube 9 transfers the adjusting movement to the bell crank 24. The bell crank is then rotated about the pivot 24c and the arm 24b then causes a swinging movement of the optical swinging element 19 or 19a of the range finder system. The other arm 24a of the bell crank then acts upon the arm 23 of the frame 20 to an extent commensurate with the extent of the axial adjustment of the objective and moves the framing member 16 together with the plate 17 in another diagonal direction along the guides 21 to compensate for the parallax of the finder system. The already existing framing of the finder picture is not disturbed because the parallax compensating movement does not affect the position of the plate 17 relative to the framing member 16.

The operations may be summarized as follows: First, when an objective with a given focal length is attached to the camera, the plate 17 is automatically moved by the rod 35 relative to the framing member 16 whereby the view is framed and seen by the observer in the ocular 13, the view then being defined within borders.

Second, the view thus framed may be compared or checked with the local scene and, if desired, the hand knob 8 may be operated so as to move the plate 17 to uncover other framing borders 16a on the member 16 whereby to frame the view differently from the first framing thereof. Such second framing operation will indicate whether changes should be made and whether a different objective should be used. When the knob 8 is released, the parts are returned into the positions of the first framing operation.

Third, if the focusing of the objective requires an axial adjustment thereof the bell crank 24 is moved by such adjustment and by the means described causes a swinging movement of the appropriate element in the optical finder system and also moves the two framing members 16 and 17 together whereby the parallax of the finder mechanism is compensated for. The adjusted position of the plate 17 relative to the member 16 is not changed by such parallax compensating movement.

Another embodiment of the invention is illustrated in Fig. 7 in which a framing member 60 is mounted in the camera to rotate about a shaft 62. The member carries several views of picture framing openings of varying dimensions. In this embodiment the rod 35 carries a toothed rack 64 which meshes with a gear 63 on the shaft 62. As the rod is raised or lowered the framing member 60 is rotated to bring any one of the openings 61 into registry with the view opening 5. The view is then framed within the registering opening 61. Otherwise the foregoing description of the operation of the finder mechanism applies also to the embodiment in Fig. 7 and is therefore not repeated.

A further embodiment is illustrated in Figs. 8–11. The objective tube 4 is provided with only the one flange 3a for actuating the finder mechanism. The correct coupling position between the objective and the camera is obtained by means of a spring catch 70 which is provided with a nose 71 which enters a notch 72 in the objective tube 4, Fig. 8. When the nose 71 engages the notch 72 the objective is in the correct position with relation to the coupling members of the finder mechanism. The action of the flange 3a upon the nose 40a of the slide 40 when the objective is attached to the camera correctly frames the view to accord with the focal length of the objective. The catch device 70, 71 may be moved a certain distance in opposite directions as shown in Figs. 10 and 11. The movements of the catch device is transferred to the flange 3a, the nose 41a and the slide 40 whereby a corresponding variation in the view framing borders is obtained. The objective tube serves in this embodiment as a manually actuated means for selective variation in the size of the view picture and the hand operated knob 8 and its associated parts are not required. The means for framing the view may otherwise be the same as described in connection with the embodiment shown in Figs. 1–4 except that the slide 40 and rod 35 are in one piece.

The invention is illustrated and described with relation to a certain type of view finder by way of example only because the invention is not limited to any particular finder construction but may be used with other finder systems with variable view framing means or view limiting means. Instead of using the bayonet joint flange for actuating the framing means in relation to the exchange of objectives some other actuating member may be used with other forms of camera-objective connections. Instead of the described curved cam, crank actuated or eccentrically actuated means may be used, or a laterally sliding curve member or cam or other means within the scope of the invention. The manually actuated member is of course placed upon the camera in a position where it interferes the least with the normal use of the camera. It is adapted for use by either hand and may be placed on the back or bottom of the camera.

Neither is the invention limited to any particular means for framing the view. Framing members may be arranged upon a drum or slide. They may be positioned directly in the path of the bundle of finder illuminating rays without requiring the use of reflecting elements. For example, pancratical systems may be used. The main principle of the invention is the provision of means whereby the view is varied to accord with the focal length of the attached objective together with manually actuated means for a selective framing of the view when the objective is already attached to the camera. The modifications of the invention herein referred to are not illustrated in the accompanying drawings.

We claim:

1. In combination, a photographic camera of the type adapted to be provided selectively with any one of a number of exchangeable objectives having different focal lengths, a view finder in said camera, means within the camera for varying the size of the image appearing in said finder, means on each of said objectives operatively engaging and differently actuating said image size varying means when the objective is attached to the camera so as to adjust automatically the size of the image appearing in the finder to accord with the focal length of the attached objective, a manually actuated mechanism on the camera normally disengaged from said image varying means and adapted for selective operative engagement therewith, manual means for operating said mechanism to selectively actuate said image varying means to vary the size of the finder image differently from the aforesaid automatic adjustment thereof and while an objective remains attached to the camera and means, operable upon cessation of said manual operation, to cause automatic disengagement between said mechanism and said image varying means for automatic restoration of the isze of the finder image as determined by said automatic adjustment thereof.

2. The combination according to claim 1 in which the said manually actuated mechanism includes a vertically movable rod, spaced shoulders formed in the upper free end of said rod, a rotatable cam, two cam steps in spaced relation on said cam and adapted to engage the said shoulders, one at a time, for alternately moving said rod in opposite directions to vary the size of the image appearing in said finder and a hand knob on the outside of the camera for rotating the cam to operate the said rod to selectively vary the size of the image appearing in the finder.

3. The combination according to claim 1 including means for automatically restoring said manually actuated mechanism to an inactive zero position after the manual actuation of said mechanism has been completed.

4. The combination according to claim 2 in which the said manually actuated mechanism includes a spring for automatically restoring said rotatable cam and hand knob to neutral normal positions when the hand knob is released and for maintaining the cam portion between the spaced cam steps in a position in contact with and opposite that portion of the said rod which lies between the said spaced shoulders thereon.

5. The combination according to claim 2 including spring means for automatically restoring said vertically movable rod to the position occupied by said rod before operation thereof by the said hand knob.

6. In a photographic camera of the type adapted to be provided selectively with any one of a number of interchangeable objectives of different focal lengths, a view finder in said camera and means for automatically adjusting the size of the image appearing in said view finder to accord with the focal length of the selected objective attached to the camera, a manually actuated mechanism in the camera adapted to be operatively connected to said image size adjusting means for selectively adjusting the size of the image appearing in the view finder to a size different from the size image obtained by said first automatic adjustment of the image size varying means and manual means for operating said mechanism independently while an objective remains attached to the camera and resilient means, automatically operable upon cessation of said manual operation of said mechanism, for restoring said image varying means to the positions to which they have been adjusted by said automatic adjustment.

7. The combination according to claim 6 wherein the said means for automatically adjusting the size of the image to accord with the focal length of the selected objective include a slidable rod, a slide engaging the rod, a spring connected to said slide to keep it in contact with the rod to maintain the rod in normal inactive position; and wherein said automatic adjusting means include an abutment on the objective of a predetermined arcual length commensurate with the focal length of the selected objective, said abutment engaging said slide to move the same away from the said rod a predetermined distance in one direction, a spring connected to said rod for moving the same a like distance in the same direction when said slide is operated as aforesaid; and wherein said manually actuated mechanism includes manual means to move said rod in the same said direction or in the opposite direction to adjust the size of the image differently from the adjustment thereof when said objective is first attached to the camera.

8. The combination according to claim 3 including a spring engaging said manual means for restoring said manual means to inactive position after the completed operation of the manual means.

9. In a photographic camera of the type adapted to be provided selectively with any one of a number of interchangeable objectives of different focal lengths, an optical system in said camera including a view finder and a range finder, means within the camera for automatically adjusting the size of the image appearing in the view finder to accord with the focal length of the selected objective attached to the camera, a manually actuated mechanism in the camera operatively engaging said image size adjusting means for selectively adjusting the size of the image appearing in the view finder to a size different from the size image obtained by said first automatic adjustment of the image size varying means while the objective remains attached upon the camera and other means within the camera connected to and interposed between said range finder and said image size varying means for moving the latter and the said range finder to compensate for the parallax of the view finder and means on the objective engaging said connecting means to operate the same when the objective is focused.

References Cited in the file of this patent
UNITED STATES PATENTS

| | | |
|---|---|---|
| 2,157,548 | Leitz | May 9, 1939 |
| 2,187,246 | Nerwin | Jan. 16, 1940 |